United States Patent [19]

Stenard

[11] Patent Number: 5,136,617
[45] Date of Patent: Aug. 4, 1992

[54] SWITCHING TECHNIQUE FOR ATTAINING SYNCHRONIZATION

[75] Inventor: Andrew K. Stenard, Freehold, N.J.

[73] Assignee: AT&T Bell Laboratories, Murray Hill, N.J.

[21] Appl. No.: 620,872

[22] Filed: Dec. 3, 1990

[51] Int. Cl.$^5$ .............................................. H04L 7/00
[52] U.S. Cl. ................................. 375/108; 331/1 A
[58] Field of Search ............... 375/120, 119, 111, 108;
370/100.1, 105.2; 455/255, 260, 259, 265; 331/1 A, 10, 11; 328/155

[56] References Cited

U.S. PATENT DOCUMENTS

| | | | |
|---|---|---|---|
| 4,305,045 | 12/1981 | Metz et al. | 375/120 X |
| 4,633,193 | 12/1986 | Scordo | 375/108 X |
| 4,651,103 | 3/1987 | Grimes | 375/108 X |
| 4,736,393 | 4/1988 | Grimes et al. | 375/108 X |
| 4,926,447 | 5/1990 | Corsetto et al. | 375/120 |
| 4,972,442 | 11/1990 | Steierman | 375/108 |
| 4,980,899 | 12/1990 | Troost et al. | 375/108 |

*Primary Examiner*—Stephen Chin
*Attorney, Agent, or Firm*—Thomas Stafford

[57] ABSTRACT

Synchronization of a local clock in a transmission system node is achieved by using synchronization circuitry such as a phase-locked loop (PLL). This synchronization circuitry is provided with a selected one of a multiplicity of timing signals derived from incoming bit streams to the node. The selected timing signal is employed by the synchronization circuity as a reference timing signal to which the local clock is synchronized. The timing-signal selection is facilitated by a switch controlled by a process or to relay the timing signal, derived from the most desirable bit stream, to the synchronization circuitry. This processor determines such a bit stream based on various indicators of the signal quality thereof. Moreover, the switch operates at such a speed that the synchronization circuitry is precluded from free-running during any switching period.

12 Claims, 3 Drawing Sheets

FIG. 3

REFERENCE TIMING SIGNAL SELECTION TABLE

| COLUMN | _NEAR | | | | | _FAR | | | | | SELECT CLOCK_ |
|---|---|---|---|---|---|---|---|---|---|---|---|
| | OK | AIS | RED-ALARM | LOOP | LOS | OK | AIS | RED-ALARM | LOOP | LOS | |
| 1 | NO | X | X | X | X | NO | X | X | X | YES | NEAR |
| 2 | NO | X | X | X | YES | NO | X | X | X | NO | FAR |
| 3 | NO | X | X | X | NO | NO | X | X | YES | X | NEAR |
| 4 | NO | X | X | YES | X | NO | X | X | NO | NO | FAR |
| 5 | NO | X | X | NO | X | NO | X | YES | X | X | NEAR |
| 6 | NO | X | YES | X | X | NO | X | NO | X | NO | FAR |
| 7 | NO | X | NO | X | X | NO | YES | X | X | X | NEAR |
| 8 | NO | YES | X | X | X | NO | NO | X | X | NO | FAR |
| 9 | NO | NO | X | X | X | NO | X | X | X | X | NEAR |
| 10 | NO | X | X | X | X | YES | X | X | X | X | FAR |
| 11 | YES | X | X | X | X | X | X | X | X | X | NEAR |

X DENOTES "DON'T CARE"

SWITCHING TECHNIQUE FOR ATTAINING SYNCHRONIZATION

TECHNICAL FIELD

This invention relates to clock circuits for use in digital transmission systems and more particularly to arrangements for synchronizing local clock circuits at nodes in such systems.

BACKGROUND OF THE INVENTION

It is oftentimes desirable to have synchronous transmission of digital signals from one node to another in a digital transmission system. However, synchronization errors occur when the average rate of digital bits received by a node is not exactly equal to the average rate of bits transmitted therefrom. Such synchronization errors are referred to as "slips" and attributed to the fact that when the input transmission rate exceeds the output rate, bits would be arbitrarily deleted or, on the other hand, when the input transmission rate is lower than the output rate, bits are repeated or inserted arbitrarily. To assure synchronization and avoid slips, the nodes are necessarily synchronized to a reference timing signal. To this end, each node includes a local timing generator, commonly known as a lock clock, which generates timing signals at a predetermined frequency. The local clock is adjusted to be in synchronization with the reference timing signal.

A prior art arrangement for realizing the desired synchronization is described in U.S. Pat. No. 4,305,045 issued Dec. 8, 1981 to Metz et al. Disclosed is a frequently estimating and synthesizing arrangement that includes a programmable controller as part of a single phase-locked-loop (PLL) to control digitally an oscillator for achieving the desired synchronization of the local clock. In such an arrangement, a particular one of transmission links to the node is fixedly connected to the PLL and provides thereto a bit stream on that particular link. This bit stream is used by the PLL to derive the reference timing signal for synchronization. However, a problem arises when this particular link fails. The digitally controlled oscillator is allowed to free-run (i.e. oscillate irrespective of any external control) at the long-term average frequency known at the node at the time of the failure. Consequently, the free-run stability of the digitally controlled oscillator is critically important in order to maintain performance objectives. Such stability is achieved by using a precision crystal oscillator kept at a temperature within a meticulously narrow range. This stability requirement undesirably incurs a substantial cost to the arrangement, stemming from the expensiveness of the oscillator used and the maintenance of the almost constant temperature environment.

An attempt has been made to solve the above-identified problem by using a digital synchronizer wherein the frequency estimating and frequency synthesizing functions are made separate. Such a digital synchronizer is described in U.S. Pat. No. 4,633,193, issued Dec. 30, 1986 to Scordo. The frequency estimation in this synchronizer is realized by computing an estimate of a difference in frequency between a received reference timing signal and a signal of a predetermined frequency, which is generated by a local fixed oscillator. A phase value representing this estimate is supplied to a phase-locked oscillator to control a digitally controlled oscillator for generating a signal having a frequency which equals the algebraic sum of the predetermined frequency and the compound frequency difference. In the event that the reference timing signal is lost or a phase error is too great, the last generated phase value is retained at a constant value and continuously supplied to the phase-locked oscillator. Consequently, even though the phase-locked oscillator is allowed to free-run, it yields an output with a stability equal to the fixed frequency oscillator, rather than the digitally controlled oscillator as required before. This reduces the aforementioned cost relating to the maintenance of the stability of the digitally controlled oscillator. Nevertheless, the cost of this digital synchronizer is still unreasonably high. This stems from the fact that the supporting circuitry of the synchronizer including the circuit for computing the phase value is undesirably complex. Moreover, the digital synchronizer also calls for a precision crystal oscillator which is expensive. The inclusion of such complex circuitry and expensive oscillator inevitably contributes to the high cost of the synchronizer.

Accordingly, it is desirable to have an apparatus which not only provides accurate synchronization, but is also inexpensive and simple in design.

SUMMARY OF THE INVENTION

The present invention overcomes the prior art limitations by an inclusion of a switch in a transmission system node for selecting one of a multiplicity of timing signals, derived from their respective incoming bit streams to the node, to be the reference timing signal for synchronization circuitry. In accordance with the invention, the selection is accomplished by using the switch to relay the timing signal derived from the most desirable bit stream to the synchronization circuitry. The relative desirability of a bit stream is determined by evaluating the signal quality thereof based on various performance indicators. Moreover, the switch operates at such a speed that the synchronization circuitry is precluded from free-running during any switching period.

Advantageously, the apparatus incorporating the present invention is much less expensive than the prior art arrangements, because it requires neither a stabilized, digitally controlled oscillator nor any complex, supporting circuitry. In fact, the present invention can be based upon a standard PLL to which is added the inventive switch controlled by a simple logic arrangement.

BRIEF DESCRIPTION OF THE DRAWING

In the drawing,

FIG. 3 is a look-up table for selecting one of the multiplicity of timing signals to be a reference timing signal for synchronization purposes in the arrangement of FIG. 1.

DETAILED DESCRIPTION

Figure 1:
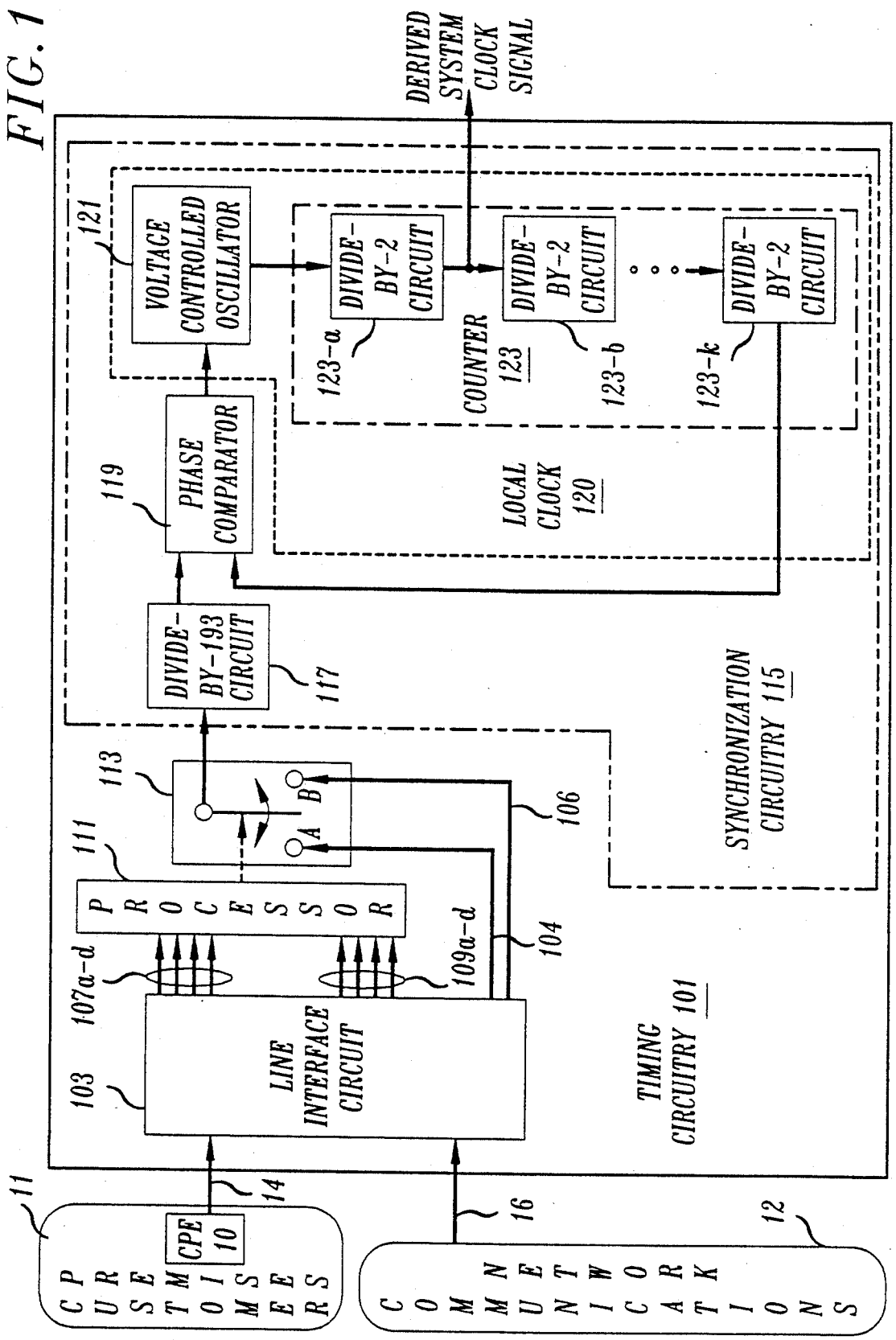
FIG. 1 is a block diagram of an arrangement embodying the principles of the invention for attaining synchronization in a transmission system node.

FIG. 1 illustrates an exemplary arrangement embodying the principles of the invention. Timing circuitry 101 is employed in a transmission system node (not shown) to provide a derived system clock signal of 8.192 MHz. A multiplicity of transmission links are terminated in timing circuitry 101. In this particular illustrative embodiment, these transmission links are two standard digital system-1 (DS1) links, which are respectively denoted near-end link 14 and far-end link 16. Link 14 transports a bit stream at 1.544 Mbps from customer premises equipment (CPE) 10 at customer premises 11 to circuitry 101. CPE 10 may be, for example, a communications switch of the type designated 4ESS TM, manufactured by American Telephone and Telegraph Co. (AT&T). At the same time, link 16 transports another bit stream from communications network 12 to circuitry 101 also at 1.544 Mbps.

Near-end link 14 and far-end link 16 extend to line interface circuit 103 within timing circuitry 101. Circuit 103, which is of conventional design, analyzes the line performance of links 14 and 16. It provides onto leads 107a through d and leads 109a through d performance data of link 14 and link 16, respectively.

Specifically, in line interface circuit 103 a loss-of-signal_near (LOS_near) indicator is active when no signal from near-end link 14 is detected by circuit 103, which could arise from a cable on link 14. The active status of the LOS_near indicator is communicated to processor 111 via lead 107a. A red-alarm_near indicator is active when the signal loss persists for more than two-and-a-half seconds or, on average, two out of five DS1 frames have been found to be in framing error for at least two-and-a-half seconds. The active status of red-alarm near indicator is communicated to processor 111 via lead 107b. An alarm-indication-signal_near (AIS_near) indicator is active when the bit sequence on link 14 consists of all binary bits of value 1 for at least two-and-a-half seconds. Such a bit sequence is standardly used to indicate an upstream failure of, for example, CPE 10 in this case. The active status of the AIS_near indicator is communicated to processor 111 via lead 107c. A loop_near indicator is active when there is a loop-back at circuit 103, In this instance, a loop-back occurs when, for example, the output of CPE 10 is fed back to the input thereof at circuit 103 for testing purposes. The active status of loop_near indicator is communicated to processor 111 via lead 107d. Similarly, processor 111 respectively receives, via leads 109a through d, active statuses of loss-of-signal_far(-LOS_far), red-alarm_far, alarm-indication-signal_far (AIS_far) and loop_far indicators with respect to the performance of far-end link 16. Line interface circuit 103 also derives a clock_near signal and a clock_far signal each of 1.544 MHz from the two incoming bit streams on links 14 and 16, respectively. The clock__near signal is provided onto lead 104 and the clock__far signal onto lead 106. Leads 104 and 106 are respectively terminated at terminal A and terminal B within switch 113.

Processor 111 collects all the performance data from leads 107a-d and 109a-d and analyzes such data in a manner to be described. Accordingly, processor 111 controls switch 113 to connect synchronization circuitry 115, which may be a standard PLL, to either lead 104 or lead 106. The actual lead selected carries a clock signal which is derived from a relatively desirable incoming bit stream for circuitry 115 to use as a reference timing signal. To this end, processor 111 determines the relative signal quality of the bit streams on links 14 and 16. This determination is made by a two-part process which is programmed in processor 111. The first part determines whether the two bit streams are in normal conditions. The second part selects either the clock__near signal or the clock__far signal to be the reference timing signal based on the already determined conditions of their corresponding bit streams. Specifically, the first part calls for two identical routines which periodically and respectively analyze the performance indicator statuses concerning near-end link 14 and far-end link 16. These two identical routines are explained in FIG. 2 by way of a state diagram.

Figure 2:
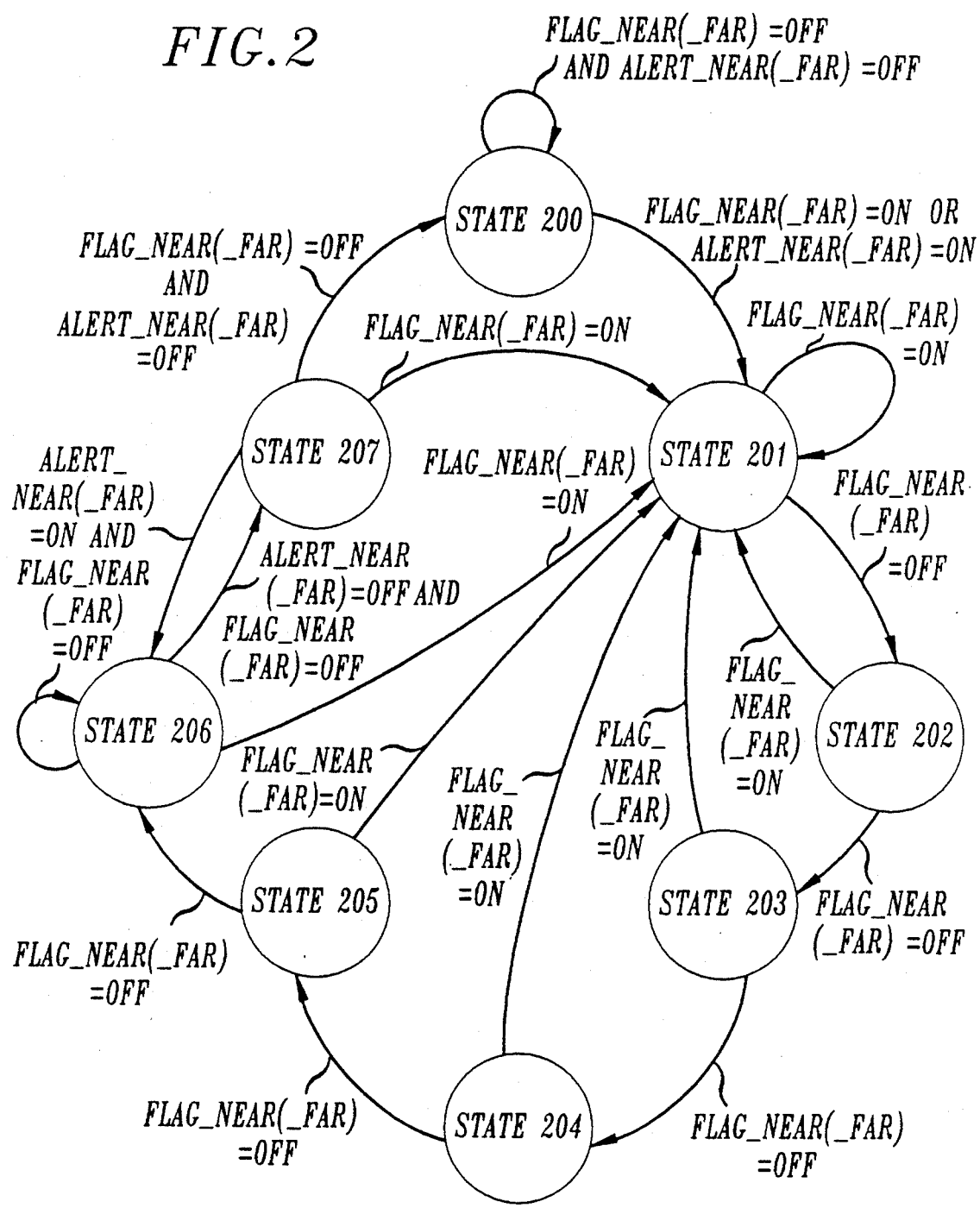
FIG. 2 is a state diagram describing a process in the arrangement of FIG. 1 for determining signal conditions of incoming bit streams from which a multiplicity of timing signals are derived.

In order to fully appreciate the state diagram of FIG. 2, four conditional variables, namely, alert_near, alert_far, flag_near and flag_far, need to be defined at this point. Alert_near (_far) is set by processor 111 when any one of the indicators—LOS_near (_far), red-alarm_near(_far), AIS_near (_far) and loop_near (_far)—is active; and otherwise it is off. Flag_near (_far) is set by processor 111 whenever alert_near (_far) transitions from an off state to an on state.

As shown in FIG. 2, the state diagram comprises eight states. State 200 is the "normal_near (_far)" state at which the bit stream on the near—(far—) end link can possibly be declared in a normal condition. Without losing the generality, processor 111 starts the routine at state 2001. It thereupon checks the statuses of the aforementioned conditional variables periodically and reacts to those statuses accordingly. (Illustratively, the period at which these statuses are checked in this particular embodiment is 0.512 second long.) After checking the statuses, processor 111 causes the routine to stay at state 200 if both alert_near (_far) and flag_near (_far) are off. Otherwise (i.e., either alert_near (_far) or flag_near (_far) is found to be on), the routine is allowed to advance to state 201. Once the routine reaches state 201, processor 111 immediately clears flag_near (_far) when in fact it is not off. The routine leaves state 201 for state 202 whenever a status check reveals that flag_near (_far) is off. On the other hand, the routine keeps returning to state 201 if every time the status check reveals that flag'near (_far) is on. The latter is possible only when, before each status check, alert_near (_far) has changed from an off state to an on state, notwithstanding the fact that flag_near (_far) is cleared every time right after the routine has reentered state 201.

In state 202, processor 111 periodically checks the status of flag_near (_far). It causes the routine to return to aforementioned state 201 when flag_near (_far) is found to be on. Otherwise, the routine is allowed to advance to the next state which is state 203. The routine traverses states 203, 204 and 205 similarly to state 202. That is, when in one of these states, the routine returns to state 201 if flag_near (_far) is on and otherwise advances to the next state. By design, states 202, 203, 204 and 205 afford delays to the routine in the course of reentering the normal_near (_far) state—state 200. These delayer are built in to ensure that one round trip from the normal_near (_far) state thereto is at least as long as two-and-a-half-seconds, which is the minimum monitor time needed for either one of the aforementioned red-alarm _near (_far) and AIS_near (_far) indicators to be activated. This being so, it can be shown that a substantial amount of unnecessary switching, which is otherwise incurred in switch 113, is avoided.

In state 206, processor 111 periodically checks the status of alert_near (_far) as well as that of flag_near (_far). Processor 111 causes the routine to return to state 201 wherein flag_near (_far) is on. On the other hand, the routine is restricted to stay at state 206 if flag_near (_far) is off and alert_near (_far) is on. Only when both alert_near (_far) and flag_near (_far) are off, the routine is allowed to advance to state 207. In state 207, the routine is programmed to return to state 201 whenever flag_near (_far) is on or state 206 whenever alert_near (_far) is on and flag_near (_far) is off. It is only allowed to reenter state 200—the normal _near (_far) state—when both of flag_near (_far) and alert_near (_far) are found to be off.

In order to appreciate the second part of the aforementioned two-part process for selecting either the clock_near signal or the clock_far signal to be the reference timing signal, additional conditional variables, namely, OK_near and OK_far, are introduced here. OK_near (_far) is set positive by processor 111 when the bit stream on the near-(far-) end link is in a normal condition, and otherwise it is negative. Alternately stated, OK_near (_far) is set and remains positive only during the time that the following condition is met:

[The routine of FIB. 2 is in the normal_near (_far) state] AND

[flag_near (_far) is continuously off] = TRUE,  (1)

where the operator "AND" is a logical operator.

Turn now to FIG. 3 which shows a reference timing selection table. Illustratively, processor 111 performs the second part of the aforementioned two-part process via table look-up based on the table of FIG. 3. As shown in FIG. 3, there are eleven columns each representing a situation characterized by the statuses of— besides OK_near (_far)—the AIS_near (_far), red-alarm_near (_far), loopnear (_far) and LOS_near (_far) indicators. In each situation, processor 111 controls switch 113 to select either the clock_near or clock_far signal to be the reference timing signal, in accordance with the table. The status of each of the indicators and the conditional variables in FIG. 3 could be either "Yes" or "No" (i.e., positive or negative, or active or inactive in the context of the description of the performance indicators—AIS_near (_far), read-alarm_near (_far), loopnear (far) and LOS_near (_far)). Where a particular statue is indicated as "X", the selection of the reference timing signal is meant to be independent from that particular status. In other words, "X" denotes the fact that we "don't care" about that particular status being "Yes" or "No."

In FIG. 3, the situations in which individual OK_far and OK_near are positive as a result of a satisfaction of condition (1) are delineated in column 10 and column 11, respectively. In column 10 where far_OK is positive and near_OK is negative (i.e., the bit stream on far-end link 16 is in a normal condition whereas the bit stream on near-end link 14 is not), the clock_far signal corresponding to the bit stream on far-end link 16 is naturally selected. It should be pointed out that in this illustrative embodiment, the clock_near signal corresponding to near-end link 14 is selected by default where all the conditions concerning bit streams on near-end link 14 and far-end link 16 are equal. This being so, in column 11 where near _OK is positive, the clock__near signal is selected regardless of the status of far_OK, which may well be positive.

Since it is possible to have situations where both near_OK and far_OK are negative, columns 1 through 9 are included to resolve the selection issue in such situations. It can be shown that this resolution, as structured in columns 1 through 9, renders the best possible reference timing stability for synchronization circuitry 115 for a given set of performance indicator statuses. The approach taken is to examine each performance indicator and evaluate its relative adverse impact on the reference timing stability when it is active. In this instance, the order (ordered based on the impacts from most adverse to least adverse with which individual performance indicators are associated) has been determined to be LOS near (_far) loop_near (_far), red-alarm_near (_far), followed by AIS_near (_far). This being so, for example, in column 5 where the red-alarm_far indicator is active, the clock_near signal is selected only when both the LOS_near and loop_near indicators are inactive. The aforementioned order is also embedded in the structure of other columns 1–4 and 6–9, whose details are fully described in FIG. 3 and thus need not be dwelled upon here.

Return now to FIG. 1. Under the control of processor 111, switch 113 relays the clock_near signal to synchronization circuitry 115 by contacting terminal A thereof, or the clock_far signal to circuitry 115 by contacting terminal B, instead. The relayed clock signal is applied, as the reference timing signal, to synchronization circuitry 115 wherein divide-by-193 circuit 117 generates a synchronization signal whose frequency is lower than that of the reference timing signal by a factor of 193. Circuit 117 may be realized in a chip, such as of the type designated Loop Divider 41KW, manufactured by AT&T. Since the frequency of the reference timing signal, being either the clock_near or clock_far signal, is 1.544 MHz, the synchronization signal is thus, 1,544 MHz/193 = 8 KHz. This synchronization signal is applied to phase comparator 119 to synchronize local clock 120 to that signal. To this end, a local clock signal from local clock 120 is also applied to phase comparator 119. In a conventional manner, phase predictor 119 determines a phase difference between the synchronization signal and the lock clock signal. It thereupon converts this phase difference to a proper voltage for adjusting voltage controlled oscillator 121 within local clock 120 to synchronize the latter. Oscillator 121, in this particular illustrative embodiment, generates a signal of nominal frequency 16.384 MHz.

It should be noted at this point that had switch 131 not been capable of switching from terminal A to terminal B, or vice versa, fast enough to relay the reference timing signal to synchronization circuitry 115, oscillator 121 would have free-run during switching periods. Thus, in accordance with the present invention, switch 131 operates at such a speed that circuitry 115 is not out of the reference timing signal long enough to allow oscillator 121 to free-run.

The signal generated by oscillator 121 is fed to counter 123 comprising, in series, eleven divide-by-2 circuits denoted 123-through-k. Each of these divide-by-2 circuits derives an output signal from an incoming signal thereto in such a way that the frequency of the output signal frequency is half as high as that of the incoming signal. The desired system clock signal is obtained at the output of divide-by-2-circuit 123-a and is of frequency 16,384 mHz/2 = 8.192 MHz. In addition, the aforementioned local clock signal is obtained at the output of divide-by-2 circuit 123-k and is of frequency $16.384 \text{ MHz}/2^{11} = 8$ KHz.

The foregoing merely illustrates the principles of the present invention. It will thus be appreciated that those skilled in the art will be able to devise numerous other arrangements which embody the principles of the invention and are thus within its spirit and scope. For example, although the disclosed arrangement is embodied in the form of various discrete electronic building blocks and components, the invention could equally as well be embodied in an arrangement in which the functions of any one or more of those building blocks and components or indeed, all of the functions thereof, are realized, for example, by one or more appropriately programmed processors.

I claim:

1. Apparatus for deriving a system clock signal, comprising:
   a first input adapted to receive a first incoming digital signal;
   a second input adapted to receive at least a second incoming digital signal;
   synchronization means having a timing signal input and being responsive to a timing signal supplied to said timing signal input for deriving the system clock signal;
   means supplied with said first and at least second incoming digital signals for obtaining a first timing signal from said first incoming digital signal, for obtaining at least a second timing signal from said at least second incoming digital signal and for obtaining a plurality of digital signal performance indicators for said first incoming digital signal and a plurality of digital signal performance indicators for said at least second incoming digital signal;
   means supplied with said plurality of digital signal performance indicators for said first incoming digital signal and said plurality of digital signal performance indicators for said at least second incoming digital signal for generating a selection control signal indicative of the selection of said first timing signal or said second timing signal obtained from said first incoming digital signal or said at least second incoming digital signal having the best relative quality based on said pluralities of digital signal performance indicators; and
   switching means responsive to said selection control signal for controllably supplying the selected one of said first and at least second timing signals to said timing signal input of said synchronization means.

2. The apparatus as defined in claim 1 wherein said synchronization means includes a phase locked loop having a voltage control oscillator and wherein said switching means includes a switching element which in response to said selection control signal switches from supplying a current one of said first and said at least second timing signals to the timing signal input of said synchronization means to supplying the other one of said first and said at least second timing signals to said timing signal input of said synchronization means in an interval less than an interval in which said voltage control oscillator in said phase locked loop would be able to achieve a free-running state.

3. The apparatus as defined in claim 1 wherein said means for generating said selection control signal includes means for evaluating said plurality of digital signal performance indicators for said first incoming digital signal and said plurality of digital signal performance indicators for said at least second incoming signal for determining the one of said incoming digital signals having the best relative quality.

4. The apparatus as defined in claim 3 wherein said means for generating said selection control signal further includes means for delaying for at least a predetermined interval reselection of one of said timing signals once the other of said timing signals has been selected to be supplied to said timing signal input of said synchronizing means.

5. The apparatus as defined in claim 4 wherein said means for evaluating evaluates said pluralities of performance indicators relative to each other to determine the one of said first incoming digital signal and said at least second incoming digital signal having performance indicators which have the least relative adverse impact on said first timing signal and at least second timing signal, respectively, and for generating said selection control signal representative of said first timing signal or said at least second timing signal impacted the least by said performance indicators.

6. The apparatus as defined in claim 5 wherein each of said plurality of performance indicators includes at least an indicator of a loss of the corresponding incoming digital signal, an alarm indication signal attributed to the corresponding incoming digital signal, a red alarm signal attributed to the corresponding incoming digital signal and a loop signal attributed to the corresponding incoming digital signal.

7. Apparatus for deriving a system clock signal, comprising:
   a first input adapted to receive a first incoming digital signal;
   a second input adapted to receive a second incoming digital signal;
   synchronization means responsive to a supplied timing signal for deriving system clock signal;
   means supplied with said first and at least second incoming digital signals for obtaining a first timing signal from said first incoming digital signal and for obtaining at least a second timing signal from said at least second incoming digital signal;
   means for determining the relative quality of said first incoming digital signal and said at least second incoming digital signal and for generating a selection control signal indicative of the one of said first timing signal and said at least second timing signal corresponding to the incoming digital signal having the best relative quality; and
   switching means responsive to said selection control signal for supplying the selected one of said first and at least second timing signals to said timing signal input of said synchronization means, said switching means including a switching element which in response to said selection control signal switches from supplying a current one of said first and said at least second timing signals to said timing signal input of said synchronization means to supplying the other one of said first and said at least second timing signals to said timing signal input of said synchronization means in an interval less than an interval in which said synchronization means would be able to enter a free-running state.

8. The apparatus as defined in claim 7 wherein said synchronization means includes a phase locked loop having a voltage controlled oscillator and wherein said switching element is responsive to said selection control signal for switching from supplying said current one of said first and said at least second timing signals to the timing signal input of said synchronization means to supplying the other one of said first and said at least second timing signals to said timing signal input of said synchronization means in an interval less than an interval in which said voltage control oscillator in said phase locked loop would be able to achieve a free-running state.

9. The apparatus as defined in claim 7 further including means for obtaining a plurality of performance indicators for said first incoming digital signal and a plurality of performance indicators for said at least second incoming digital signal and wherein said means for determining said relative quality and for generating said selection control signal includes means for evaluating said plurality of digital signal performance indicators for said first incoming digital signal and said plurality of digital signal performance indicators for said at least second incoming signal for determining the one of said incoming digital signals having the best relative quality.

10. The apparatus as defined in claim 9 wherein said means for determinating said relative quality and for generating said selection control signal further includes means for delaying for at least a predetermined interval reselection of one of said timing signals once the other of said timing signals has been selected to be supplied to said timing signal input of said synchronizing means.

11. The apparatus as defined in claim 10 wherein said means for evaluating evaluates said pluralities of performance indicators relative to each other to determine the one of said first incoming digital signal and said at least second incoming digital signal having performance indicators which have the least relative adverse impact on said first timing signal and at least second timing signal, respectively, and for generating said selection control signal representative of said first timing signal or said at least second timing signal impacted the least by said performance indicators.

12. The apparatus as defined in claim 11 wherein each of said plurality of performance indicators includes at least an indicator of a loss in the corresponding incoming digital signal, an alarm indication signal attributed to the corresponding incoming digital signal, a red alarm signal attributed to the corresponding incoming digital signal and a loop signal attributed to the corresponding digital signal.

* * * * *